3,287,156
LEAK-INDICATING COATINGS FOR MISSILES AND ROCKETS
James R. Griffith, Riverdale Heights, Md., assignor to the United States of America as represented by the Secretary of the Navy
No Drawing. Filed Dec. 27, 1962, Ser. No. 247,767
3 Claims. (Cl. 117—72)

The invention described herein may be manufactured and used by or for the Government of the United States of America for governmental purposes without the payment of any royalties thereon or therefor.

The invention relates to leak-indicating coating for use with missiles and rockets and is especially directed to lacquer coatings which undergo a distinctive color change when contacted by liquid propellant fuels and oxidants.

All liquid fuels and oxidants for guided missiles and rockets pose some degree of hazard in handling and storing. In the case of kerosene and the like the hazards are moderate, but chemically reactive fuels and oxidants, such as, red and white fuming nitric acids, hydrazine derivatives, amines or halogen fluorides, constitute a serious hazard because of their toxicity and explosive reactivity. Even minute leakage can cause injury to personnel and lead to fire or explosion.

In an effort therefore to minimize hazards in handling and storing high-energy liquid components, it has been found advantageous to provide a leak-indicating system whereby leakage or spillage may be quickly detected. The present invention provides indicating coatings which are applied to missiles, rockets, or other surfaces which are apt to come in contact with liquid fuels and oxidants of the type mentioned above. The coated surfaces in accordance with the invention undergo an immediate, conspicuous color change which is sufficiently specific to indicate the type of liquid component that has leaked or spilled from its container.

An object of the present invention is to provide novel means for indicating the escape of liquid propellants from missiles, rockets or other storing vessels.

Another object of the invention is to provide lacquer coatings which respond to the exposure of liquid propellant components by forming distinct color changes indicative of the particular type of component involved.

A further object of the invention is to combine different indicators in a lacquer system by which leakages of liquid propellants become immediately perceptible.

A still further object of the invention resides in separate indicating coatings which are combined to form an effective leak-indicating system.

Further objects and advantages of the invention will become apparent hereinafter and will be understood from the following description of a preferred embodiment thereof.

According to my invention, indicating coatings containing an oxidation-reduction indicator and an acid-base indicator are applied to the surface of the object to be protected to provide a solid, adherent finish for protective and decorative purposes. These indicators are provided in organic resin and other specified finishes in the form of composite layers or coatings. A first coating or undercoat containing a dispersion of the oxidation-reduction indicator is applied initally and allowed to dry; a second coating or cover coat containing the acid-base indicator is then applied over the first coating. A suitable oxidation-reduction indicator which gives outstanding color responses to powerful oxidants is commonly referred to as phenosafranine, also known as Safranin B Extra and chemically designated as 3,7-diamino-5-phenylphenazinium chloride. A suitable acid-base indicator for the top coating is phenolphthalein which remains substantially colorless in the anhydrous condition and is therefore preferred for white and other light top coats. Generally, this indicator will not render color reactions in the absence of water; however, in the cover coating, as specified herein, it can be used with fuming alkaline fuels such as diethylenetriamine, dimethyl hydrazine, and the like, which extract moisture from the air.

Missiles may be conveniently coated with lacquers, preferably of white or other light color.

For example, cellulose based lacquers, such as nitrocellulose and the esters, cellulose acetate and cellulose butyrates; acrylic, vinyl, phenolic resins, and other solvent-type resins may be employed for this purpose. In accordance with my invention, therefore, a lacquer may be modified by incorporating therein a dispersion of phenosafranine for the first coating. This indicator imparts a pink tint to the white lacquer in which it is incorporated, but the pink tint is substantially hidden by a white top coat. The second lacquer coating contains a dispersion of phenolphthalein which remains colorless. The combined coatings of the present invention provides a convenient indicating system in which the oxidation-reduction indicator is protected from light and moisture by the cover coat. This indicating system enables the use of materials that could not be exposed directly to weathering. Furthermore, the oxidation-reduction indicator specified herein is sufficiently nonbleeding when formulated in accordance with the present invention and remains hidden by the cover coat. Other oxidation-reduction indicators cause some bleeding through a light cover coat.

The indicating coatings undergo distinct color changes to the action of propellant fuels and oxidants. The color produced by liquid oxidants is blue-black, while the color of the coating becomes purple-red when a hydrazine type fuel has contacted the surface.

A white lacquer suitable for coating missile surfaces, etc., conforms to Military Specification, MIL–L–717A. This lacquer may be modified in accordance with the the present invention to form a white indicating surface capable of an immediate, conspicuous color change on coming in contact with either fuel or oxidant component. The lacquer composition has a nonvolatile content of about 44% on the average. The lacquer for the first coating is prepared by adding 4% phenosafranine by weight of the lacquer solids. The mixture is then thinned with about 90 parts of ethyl acetate by weight or with other suitable thinners. The mixture is placed on slow-turning rollers for about 16 hours to assure thorough homogeneous blending. A pink lacquer is obtained in which bits of the pigment remain suspended. This suspension of phenosafranine is found desirable since complete dissolution of the indicator will promote bleeding through the cover coat. The ethyl acetate thinner provides a mixture that builds up a sufficiently thick indicating layer in a single application.

The white cover coat is prepared by adding 4% phenolphthalein by weight of the lacquer solids. The mixture is then thinned with about 90 parts of ethyl acetate by weight and turned on rollers, as described previously, to obtain a uniform lacquer mixture.

The undercoat is applied by any conventional application and allowed to dry for at least one hour before the white cover coat is applied. When thinned in the manner described herein, two applications of said white coating may be made if the initial cover coat retains a pink tinge. The indicating coatings may retain a grainy surface due to the suspended indicators. The color produced by oxidants is blue-black initially but after several hours, the color turns brown. The hydrazine fuels extract the phenosafranine and the phenolphthalein intensifies its color to give a purple-red indication. The color response time is less than five seconds for two drops of fuel. An observer can readily detect the indicating colors at a distance of more than 75 feet and can distinguish the colors formed.

An alternate embodiment of the invention provides for a clear lacquer top coat in which the phenolphthalein is dissolved in a suitable solvent. The indicating coatings will retain the pink color of the undercoat.

When the indicating coatings have not been weathered for extended periods, two drops of either fuel component will cause rapid development of the appropriate color. Upon extensive weathering the hydrazine indicator will become slower, however, ten drops or more are indicated within a minute. The oxidant indicator remains rapid and intense even after extensive weathering.

Obviously many modifications and variations of the present invention are possible in the light of the above teachings. It is therefore to be understood that within the scope of the appended claims the invention may be practiced otherwise than as specifically described.

What is claimed is:

1. A leak indicating system including a vessel for storing propellant fuels and oxidizers which comprises an under-coating on the exterior side of said vessel and a cover-coating on said under-coating, each of said coatings comprising a light-colored solid organic material selected from the group consisting of cellulose base lacquers and solvent-type resins, the under-coating containing phenosafranine dispersed therein and the cover-coating containing phenolphthalein dispersed therein.

2. A leak indicating system as defined in claim 1, wherein said coatings are cellulose ester lacquers.

3. A leak indicating system as defined in claim 2, wherein the amount of phenosafranine is 4% based on the weight of the lacquer solids.

References Cited by the Examiner

UNITED STATES PATENTS

| | | | |
|---|---|---|---|
| 934,500 | 9/1909 | Bouchaud-Praceiq | 23—253 |
| 1,478,445 | 12/1923 | McClure | 23—230 |
| 2,228,737 | 1/1941 | Tandberg et al. | 23—230 |
| 2,249,867 | 7/1941 | Snelling | 23—253 X |
| 2,537,124 | 1/1951 | Earle et al. | 252—408 X |
| 2,567,445 | 11/1951 | Parker | 23—253 X |

OTHER REFERENCES

Lange: Handbook of Chemistry, page 960 (ninth edition, 1956), Handbook Publishers, Inc., Sandusky, Ohio.

MORRIS O. WOLK, *Primary Examiner*.

J. SCOVRONEK, *Assistant Examiner*.